May 3, 1938.  F. A. FURLONG  2,115,988
HEATING SYSTEM
Filed Aug. 13, 1934  4 Sheets—Sheet 1
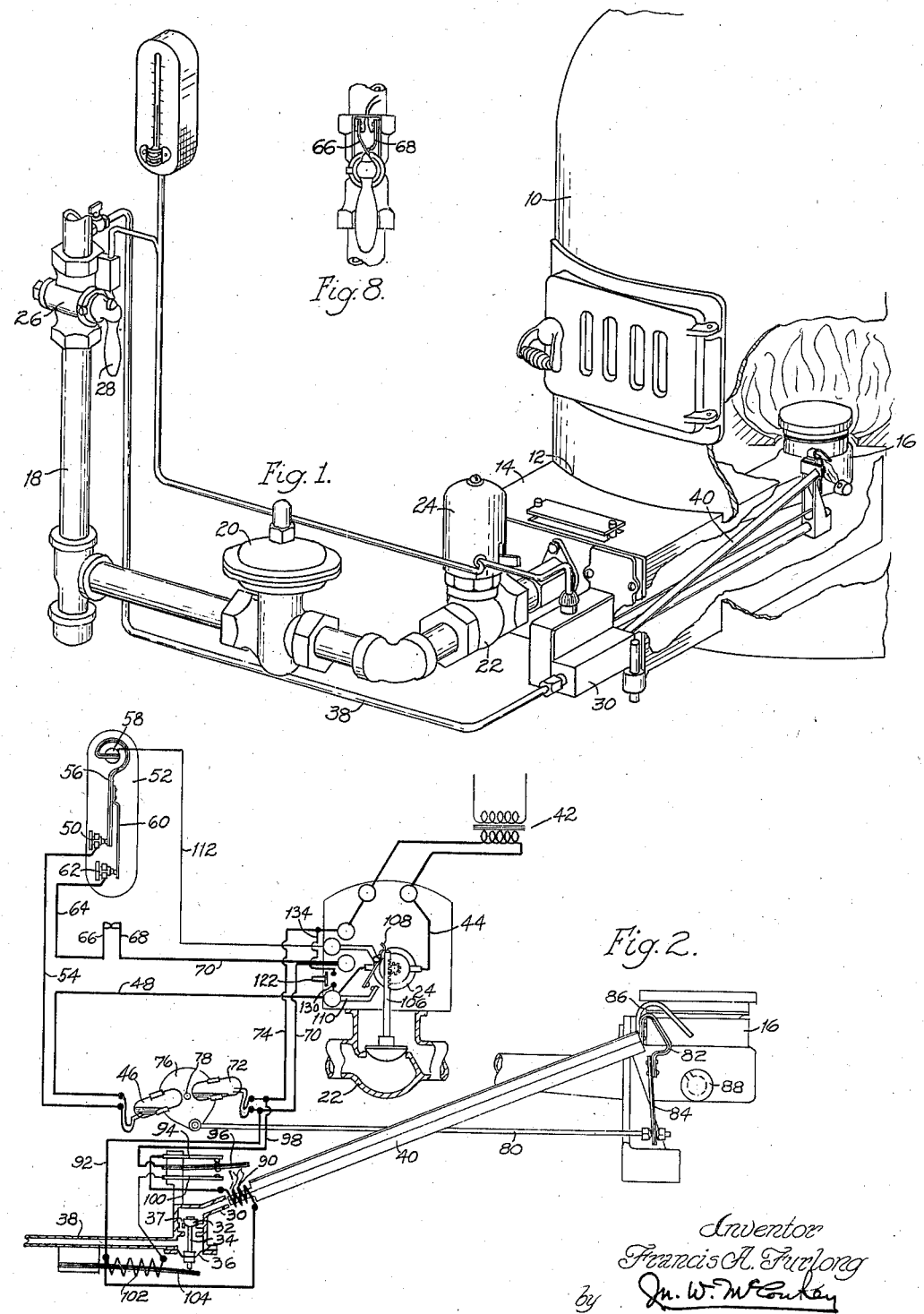
Inventor
Francis A. Furlong
by Jn. W. McCuskey
Attorney May 3, 1938.  F. A. FURLONG  2,115,988
HEATING SYSTEM
Filed Aug. 13, 1934  4 Sheets-Sheet 2
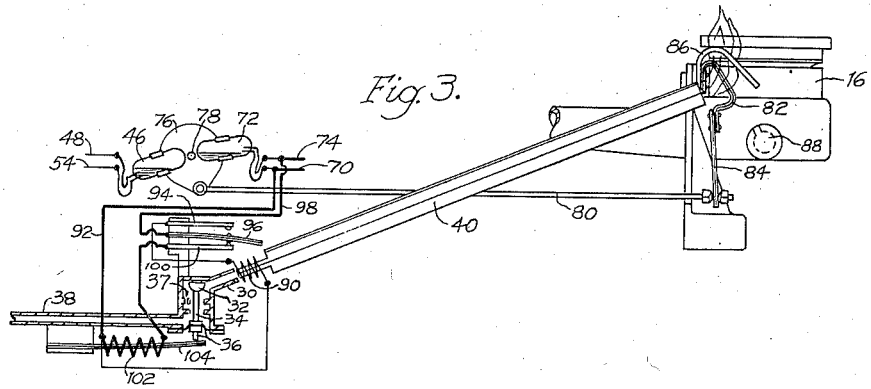
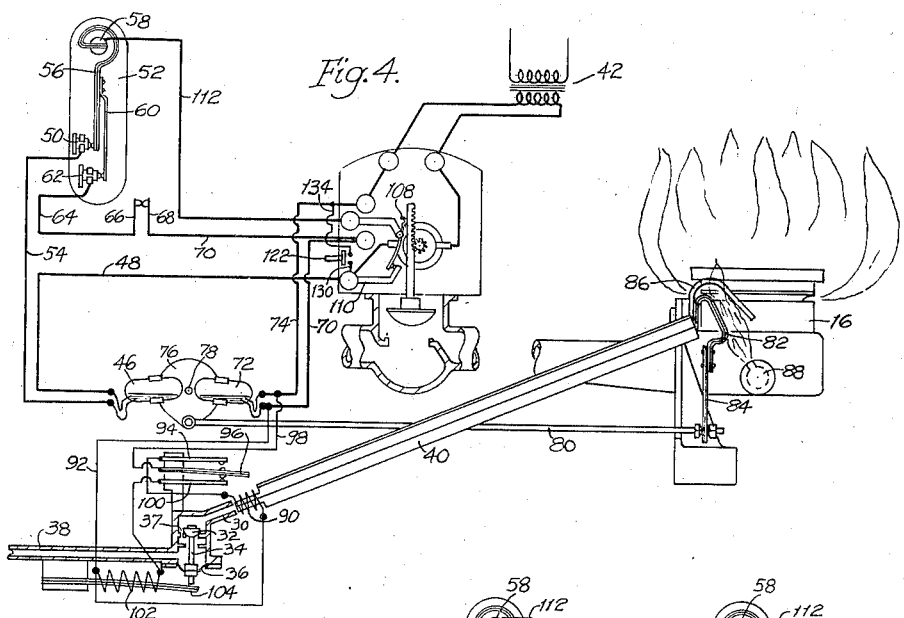
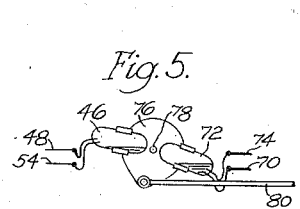
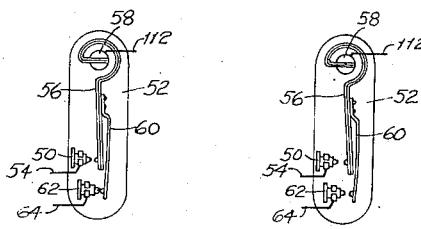
Inventor
Francis A. Furlong
by
Attorney May 3, 1938.  F. A. FURLONG  2,115,988
HEATING SYSTEM
Filed Aug. 13, 1934   4 Sheets-Sheet 3
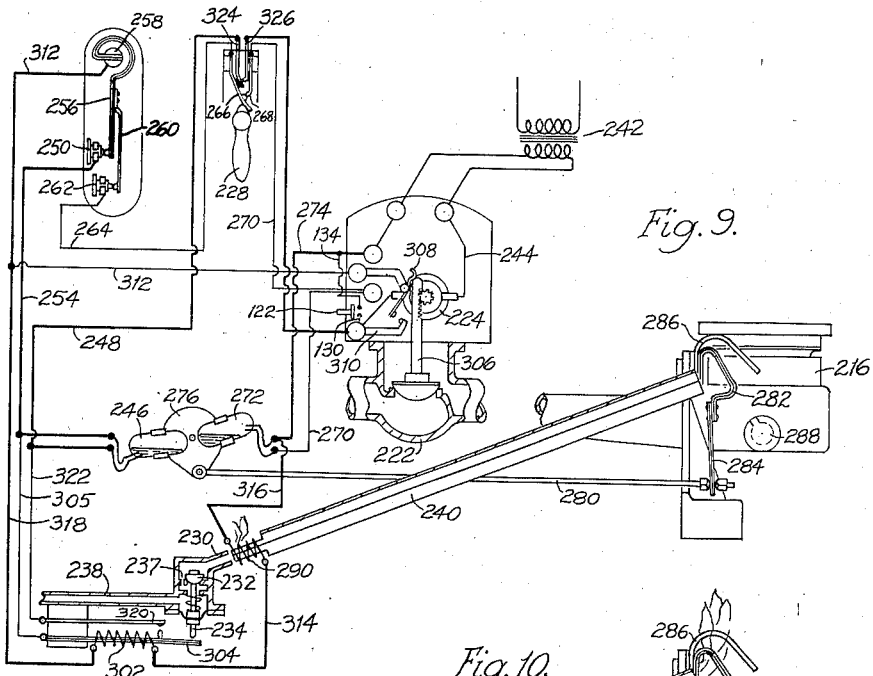
Fig. 9.
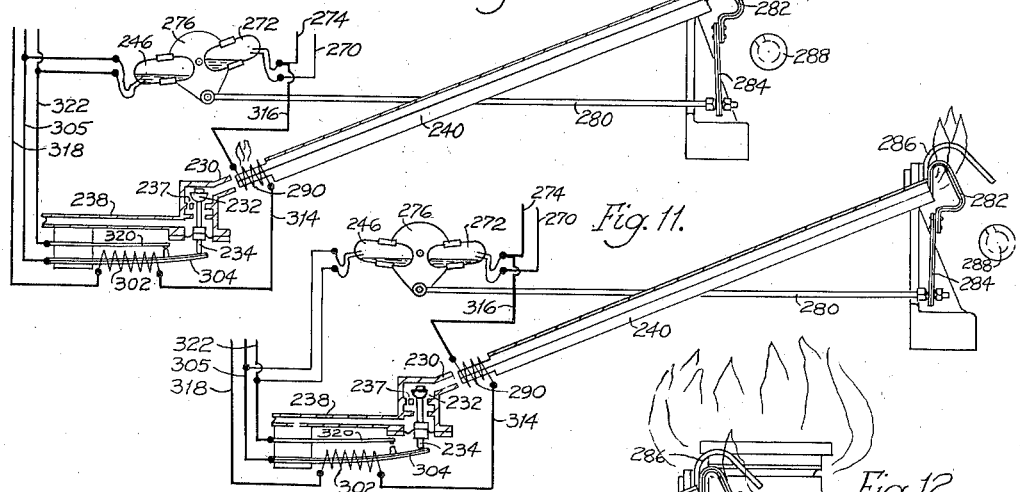
Fig. 10.
Fig. 11.
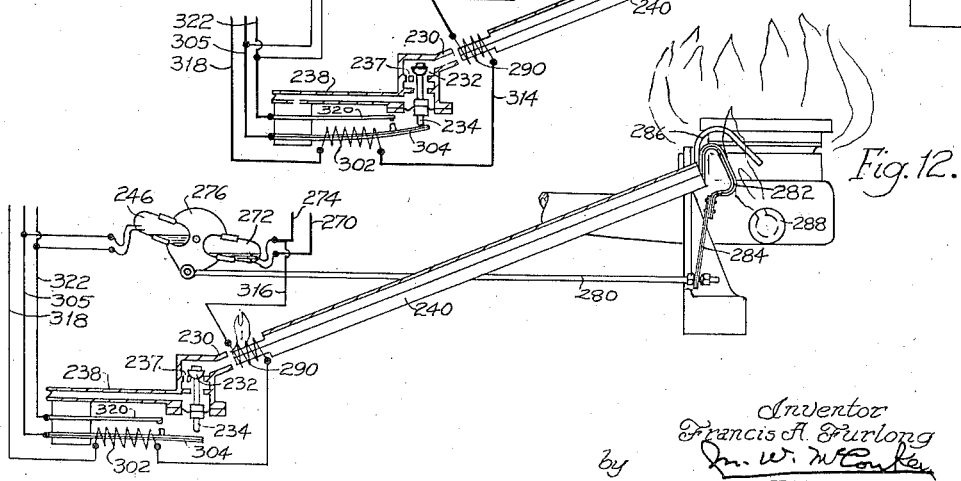
Fig. 12.
Inventor
Francis A. Furlong
by M. W. McConkey
Attorney May 3, 1938.  F. A. FURLONG  2,115,988
HEATING SYSTEM
Filed Aug. 13, 1934  4 Sheets-Sheet 4

Inventor
Francis A. Furlong
by
M. W. McConkey
Attorney

Patented May 3, 1938

2,115,988

UNITED STATES PATENT OFFICE 2,115,988

HEATING SYSTEM

Francis A. Furlong, Chicago, Ill., assignor to Autogas Corporation, Chicago, Ill., a corporation of Delaware Application August 13, 1934, Serial No. 739,530

13 Claims. (Cl. 158—28)

This invention relates to heating systems and more particularly to domestic heating plants including a gas conversion burner.

In the construction of domestic heating plants, and more particularly of those employing gas as fuel, it is imperative that the controls be so arranged that their operation is as nearly foolproof as possible. Otherwise the danger of explosions resulting from improper operation by unskilled operators is imminent, such explosions being extremely dangerous and liable to result in serious damages.

Accordingly it is one of the objects of the present invention to provide a heating plant, and more particularly one employing a gas conversion burner, in which the danger of explosion is minimized and whose operation is practically foolproof under all conditions.

Further in heating plants employing constantly burning pilots there is danger of the furnace filling with unburned gas if the pilot should accidentally be extinguished and unless this gas is removed from the furnace before relighting the same the danger of an explosion is very great. Further if the pilot should accidentally become extinguished the heating plant will not supply heat to the building and its temperature might drop to such an extent as to cause serious damage thereto; for example by freezing water pipes, etc. If the pilot flame is made large enough to minimize the possibility of its accidental extinguishment the quantity of gas consumed thereby is unreasonably large resulting in a corresponding increase in operating costs.

According to the present invention a pilot or igniting burner which preferably burns constantly with a small flame is provided in connection with a control circuit including a lighter which assures that the pilot is burning before fuel is admitted to the main burner. As an alternative arrangement the pilot may normally be extinguished and lighted by the lighter each time it is desired to light the main burner. Thus extreme economy is secured and at the same time all danger due to accidental extinguishment of the pilot is eliminated.

In one desirable form of apparatus according to the invention, a pilot or igniting burner is provided outside of the furnace and adapted to project its flame into the furnace adjacent the main burner when it is desired to light the main burner. This pilot is preferably burning constantly with a small flame which burns entirely outside of the furnace and is controlled by a valve which is operated by an electrically heated thermal element controlled by thermostats. There is also preferably provided a lighter to ignite the pilot electrically, in case it should be extinguished, before or simultaneously as the supply of fuel thereto is increased.

Operation of the heating plant is preferably controlled by a thermostat in the room or other space to be heated and a thermostat in the furnace responsive to the temperature of the igniting burner, the main burner and the furnace itself. The control circuit is so arranged that the room thermostat will close when the room temperature reaches a predetermined low to operate the electric lighter and light the pilot burner. In one arrangement heat from the pilot operates a thermal element which opens the lighter circuit and closes a control circuit for the pilot so that the supply of fuel to the pilot will be increased. If the pilot is burning when the room thermostat closes the pilot control circuit will be closed immediately and the electric lighter circuit will remain inoperative.

In another arrangement the lighter is connected in the pilot control circuit so that both will be energized simultaneously, the pilot in this case adapted to burn constantly or to be extinguished and relighted at each cycle of operation.

When the supply of fuel to the pilot is increased its flame is projected through a lighter tube into the furnace and heats a thermostat, preferably of the type described and claimed in my copending application Serial No. 515,375, filed February 12, 1931. As this thermostat is heated it operates a switch mechanism to operate a motor to admit fuel to the main burner, the main burner being lighted by the pilot. The main burner continues to burn until the room temperature reaches the desired degree or until the furnace temperature reaches a predetermined maximum at which time the motor is de-energized and the supply of fuel to the main burner is shut off.

According to a further feature of the invention a manual valve is provided in the fuel main for use in shutting off the fuel supply to prevent operation of the heating plant as when closing it down for the summer. An electric switch is preferably provided in the control circuit and connected to this valve so that when the valve is closed the switch will interrupt the control circuit and prevent waste of electric current.

This switch is preferably so arranged that it will interrupt the control circuit and prevent operation of the heating plant if the manual valve is only partially closed. Thus attempts to regulate the gas pressure by the manual valve are effectively prevented and the heating plant is assured of a supply of gas at the proper pressure at which it is designed to operate.

It is desirable at times to be able to operate a heating plant manually as in the event of failure of electric current for a considerable period of time or when, for some other reason, a supply of electric current is not immediately available. According to the present invention manual operation is easily possible without sacrificing any of the safety features, it preferably being effected by providing a manually controlled by-pass around the automatic pilot control valve. There is also provided a locking means for preventing opening of the main burner valve, the locking means being releasable by a thermostat responsive to the pilot temperature so that the main burner valve can be opened only when the pilot is burning. This arrangement prevents the discharge of unburned gas into the furnace and assures that the main burner will be lighted when its valve is opened.

A manually operable latch is also preferably provided to retain the main burner valve in open position when it is opened manually and a switch is operated by the latch to complete a circuit through the main burner valve motor regardless of the position of the control thermostats. By this arrangement the motor will be energized as soon as electric current is available and its first operation will release the latch and open the latch operated switch so that the heating plant will again become subject to the thermostatically operated control circuit.

Other objects and novel features including various novel combinations of parts and particular constructions will be apparent from the following detailed description when taken in connection with the accompanying drawings showing apparatus embodying the invention. It is to be expressly understood, however, that the drawings are for the purpose of illustration only and are not to be taken as a definition of the limits of the invention, reference being had for this purpose to the appended claims.

In the drawings wherein the same reference numerals indicate the same parts throughout the several views:

Figure 1 is a partial view of a heating plant embodying the present invention;

Figure 2 is a diagrammatic view of the control mechanism for the heating plant of Figure 1;

Figure 3 is a partial view similar to Figure 2 showing the parts in a different position;

Figure 4 is a view similar to Figure 2 showing the parts in a still different position;

Figure 5 is a partial view showing another position of the switch mechanism of Figures 2 to 4;

Figures 6 and 7 are diagrammatic views of the room thermostat showing it in different positions;

Figure 8 is a view of the manual cut off valve and switch;

Figures 9 to 12 are views similar to Figure 2 showing a modified arrangement of the control mechanism in different positions.

Figures 13, 14:
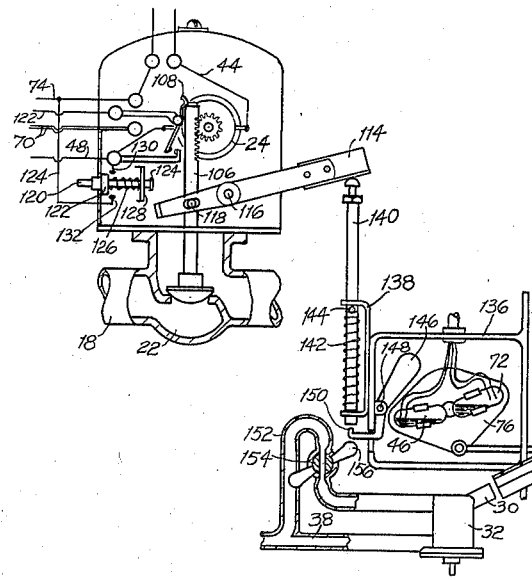
Figures 13 and 14 are partial diagrammatic views showing the manual control means.

Referring more particularly to Figures 1 to 8 of the drawings there is shown a heating plant embodying the invention constituted by a furnace 10 having a side opening 12 through which a conversion burner 14 extends. The conversion burner is formed as an elongated, boxlike assembly supporting inside the furnace a main burner 16 which is supplied with gas through a pipe 18. A suitable reducing valve 20 is provided in the pipe 18 to assure the correct gas pressure for operating the burner and a control valve 22 operated by a suitable electric motor 24 is provided for controlling the supply of gas to the burner. A manual cut off valve 26 having an operating handle 28 is also preferably provided in the pipe 18 to cut off the supply of fuel to the burner at will, as when shutting down the heating plant for the summer.

An igniting burner or pilot 30 is mounted on the conversion burner outside of the furnace and is provided with a control valve 32 having an elongated stem 34 extending through the valve casing and maintained in gas tight relation therewith by a diaphragm 36. A small constant leak 37 past the valve 32 is preferably provided to enable the pilot to burn with a small flame when the valve is closed. Gas is supplied to the pilot through a pipe 38 shown as connected to pipe 18 ahead of valve 26 though if desired it may be connected to pipe 18 behind valve 26. A lighter tube 40 extends from adjacent the igniting burner into the furnace adjacent the main burner, for a purpose to appear more fully hereinafter.

Operation of the heating plant is controlled automatically by means of an electric control circuit having a suitable source of power such as a transformer 42. One side of the transformer is connected directly to one side of the motor 24 through a lead 44, the other side of the motor being connected to one contact of a mercury switch 46 through a lead 48. The other contact of mercury switch 46 is connected to a fixed contact 50 of a double contact room thermostat 52 through a lead 54.

The thermostat 52 is constituted by a bimetallic element 56 secured at one end to a fixed post 58 and having on its other end a contact adapted to engage the contact 50. A spring strip 60 is riveted or otherwise securely fastened to the bimetal strip 56 and carries a contact adapted to engage a second fixed contact 62. The spring strip is normally biased to the left as viewed in Figures 2, 4, 6, and 7 so that it engages the fixed contact 62 prior to engagement of the bimetal strip 56 with fixed contact 50.

Fixed contact 62 is connected through a lead 64 with one contact 66 of a switch which is mounted adjacent valve 26 to be controlled simultaneously therewith. The contact 66 is adapted to be moved into engagement with a second contact 68 by the valve handle 28 to complete the circuit through the switch when the valve is in its open position and to spring away from contact 68 to interrupt the circuit through the switch when the valve is turned to its closed or only partly opened position as will be clear from Figure 8 of the drawings.

The contact 68 is connected through a lead 70 with one contact of a tiltable mercury switch 72, the other contact of which is connected through a lead 74 with the other side of the transformer 42. The mercury switches 46 and 72 are both secured to a plate or disc 76 oscillatable about a fixed axis 78 and whose position is controlled through a rod 80 pivotally connected thereto by a thermal element inside of the furnace. This thermal element is preferably of the type fully described and claimed in my copending application Serial No. 515,375 filed February 12, 1931 and is constituted by a curved bimetal strip 82 secured at one end to a fixed part adjacent the inner end of the lighter tube 40 and the main burner 16. A straight bimetal strip 84 is secured to the free end of strip 82 and the two strips are so arranged as to deflect in opposite directions. A deflector element 86 is secured adjacent the fixed end of strip 82 and a step-up pilot 88 is secured to main burner 16 to receive fuel simultaneously therewith and is so arranged as to direct at least a portion of its flame beneath the deflector 86 against the strip 82. Flame issuing from the lighter tube 40 is also adapted to heat the strip 82 so that this strip is responsive to the temperature of both the pilot and main burner while strip 84, being out of the path of flames from either burner, is affected only by the internal temperature of the furnace.

The pilot or igniting burner is lighted by an electric lighter coil 90, one side of which is connected to lead 70 by a wire 92 and the other side of which is connected to a fixed contact 94. The fixed contact 94 is adapted to be engaged by a bimetal strip 96 which is connected through a lead 98 with the lead 74. A second fixed contact 100 is also mounted to be engaged by the bimetal strip 96 and this contact is connected to one end of a heating coil 102 the other end of which is connected to the lead 92. A bimetal strip 104 is mounted adjacent the coil 102 to be heated thereby, and has its free end arranged to engage the end of valve stem 34 so that when coil 102 is heated, strip 104 will move upwardly to open valve 32.

The valve 22 is provided with an elongated stem 106 having rack teeth thereon in mesh with a pinion on the shaft of motor 24 so that when the motor is energized the valve stem will be raised to admit gas to the main burner. A lever 108 is pivoted intermediate its ends and is so mounted that one end will be engaged by the valve stem as it is raised to move the other end into engagement with a fixed contact 110 which is connected to the lead 48. The lever 108 is connected by a lead 112 to the bimetal strip 56 to form a holding circuit whose purpose will appear hereinafter.

Assuming that the valve 26 is open, contacts 66 and 68 closed, the furnace cold, room temperature so low that contacts 60, 62 and 56, 50 are closed, and the pilot out, the parts will occupy the positions indicated in Figure 2. This is the condition obtaining when the valve 26 is opened to start the heating plant after it has been shut down or when for some reason the pilot is extinguished. It will be noted that the bimetal strip 96 has moved up to engage contact 94, which is the position it will assume when the pilot is extinguished, and that a circuit through the electric lighter is completed through lead 44, motor 24, lead 48, switch 46, lead 54, strips 56 and 60, lead 64, contacts 66, 68, lead 70, lead 92, coil 90, contact 94, bimetal strip 96, and leads 98 and 74 back to the transformer. The electric lighter will now ignite gas escaping from pilot 30 past leak 37 and as the pilot burns it will heat strip 96 causing it to move into the position shown in Figure 3 in which it engages contact 100. In this position a circuit will be established through coil 102 which will be identical with the circuit through coil 90 except that from lead 92 current will flow through coil 102, contact 100, strip 96 and leads 98 and 74 to the transformer. It will be noted that in both of the circuits described current flows through the motor 24 but in each case the current will be so small due to inclusion in the circuit of either coil 90 or 102 that the motor will not be operated and valve 22 will remain closed.

As coil 102 heats up it heats strip 104 which opens valve 32 to increase the supply of gas to the pilot, which will burn with a flame sufficiently large to project through the lighter tube 40 into the furnace. This large flame heats the strip 82 causing it to expand and rock the plate 76 into the position shown in Figure 4 in which both switches 46 and 72 are closed. This completes a circuit through the motor as follows: from the transformer through lead 74, switch 72, lead 70, contacts 66, 68, lead 64, strips 60 and 56, lead 54, switch 46, lead 48, motor 24, and lead 44 back to the transformer. At this time coil 102 is shunted out by switch 72 and starts to cool off but there will be sufficient lag in the parts so that the valve 32 will remain open for an appreciable interval of time sufficient to open the main burner valve.

With the parts in this position the valve 22 will be opened and gas supplied to the main burner 16 and step-up pilot 88 which forms, in effect, a part of the main burner, this gas being ignited by the flame issuing from the lighter tube 40. It will be noted from Figure 4 that at least a portion of the flame from step-up pilot 88 passes between the deflector 86 and strip 82 so that this strip will be heated continuously to maintain the disc 76 in the position shown in Figure 4 or, upon further heating, to rock the disc into the position shown in Figure 5. In this position the motor is in circuit through lead 74, switch 72, lead 70, contacts 66 and 68, lead 64, strips 60 and 56, lead 112, lever 108, contact 110, lead 48 and through the motor 24 back to the transformer through lead 44. Thus the motor will continue to be energized and valve 22 will remain open to supply gas to the main burner.

As the room or other space to be heated increases its temperature the strip 56 will deflect into the position shown in Figure 6 in which strip 56 is disengaged from contact 50 but strip 60 remains in contact with contact 62. Under these conditions the motor will continue to be energized through the holding circuit described above. As the temperature of the room increases further strip 56 will deflect into the position shown in Figure 7 in which strip 60 is disengaged from contact 62. In this position the motor 24 will be de-energized and valve 22 will close shutting off the supply of fuel to the main burner. There now being no heat applied to strip 82 it will cool off, returning disc 76 to the position shown in Figure 2. The parts are then in position to repeat the cycle of operations as soon as the room cools enough to cause strip 56 to deflect into the position shown in Figure 2.

It will be understood that if the pilot is burning at the time the room thermostat closes, strip 96 will occupy the position shown in Figure 3 and coil 102 will be placed in circuit immediately while coil 90 will not be placed in circuit at all.

In the event the room is extremely cold as in first starting the heating plant in the morning, the furnace might tend to become overheated before the room temperature is increased sufficiently to open the room thermostat. In order to eliminate this possibility the bimetal strip 84 is provided expanding in a direction opposite to strip 82. Thus as the furnace becomes extremely hot the expansion of strip 84 counteracts the expansion of strip 82 and returns disc 76 to the position shown in Figure 2 to close valve 22 and stop the main burner. It will be noted that in this condition valve 32 will be reopened and held open and the pilot will burn with a large flame so that if the furnace cools down before the room temperature is raised and valve 22 is reopened, the pilot will be ready to light gas coming from the main burner.

When it is desired to shut down the heating plant it is only necessary to close valve 26, simultaneously opening contacts 66 and 68. Thus supply of fuel to the main burner is cut off and at the same time the electric control circuit is interrupted to prevent waste of electric current. It may be desirable under some conditions to permit the pilot to burn with a small flame even though the rest of the heating plant is shut off and for this reason it is preferred to connect the pilot to the gas supply ahead of valve 26, a separate shut-off valve preferably being provided for the pilot. However, if desired the pilot may be connected behind the valve 26 in which event closure of this valve will completely shut off the heating plant.

It will be noted that contacts 66 and 68 are also disengaged to interrupt the control circuit even when valve 26 is only partially closed. This arrangement effectively prevents attempts to regulate the gas pressure by adjusting valve 26, which might result in such an extreme reduction of pressure as to prevent proper operation of the burner, and assures that the pressure at the burner will always be that for which valve 20 is set.

Referring to Figures 9 to 12 of the drawings there is shown a modified form of the control mechanism, parts in these figures corresponding to like parts in Figures 2 to 8 being indicated by the same reference numerals plus 200. In this arrangement the lighter coil 290 and coil 302 are connected in series by a lead 314, the lighter coil being connected to lead 274 by a lead 316, and coil 302 being connected to lead 312 which is connected to the bimetal strip 256 by a lead 318. Lead 248 is connected to a fixed contact 320 by a lead 322 and the bimetal strip 304 is connected to lead 254 by a lead 305 and carries a contact adapted to engage contact 320 when it is deflected into a position to open the valve 232.

A double pole manual cut-off switch is preferably provided in place of the single pole switch shown in Figures 2 to 8, including in addition to the contacts 266 and 268, a second pair of contacts 324 and 326. These contacts are shown as mounted between and insulated from the contacts 266 and 268 in such a manner that they will be closed by valve handle 228 at the same time contacts 266 and 268 and will spring open at the same time that contacts 266 and 268 spring open. The contacts 324 and 326 are connected in lead 248 to interrupt the circuit therethrough when they are disengaged. Without this second pair of contacts a circuit might be completed through lead 244, motor 224, lead 248, switch 246, lead 254, strip 256, leads 312 and 318, coils 302 and 290 and leads 316 and 274, back to the transformer even with the manual valve closed and contacts 266 and 268 open. This would be a useless waste of current and would also waste gas at the pilot if it were connected to the main independently of the manual valve and contacts 324 and 326 connected in lead 248 are therefore desirable to interrupt the above-described circuit.

In this construction with both the furnace and space to be heated cold the parts occupy the position shown in Figure 9 and a circuit is completed from the transformer through lead 244, motor 224, lead 248 and contacts 324 and 326, switch 246, lead 254, strip 256, leads 312 and 318, coil 302, lead 314, coil 290, and leads 316 and 274 back to the transformer. Both coils 302 and 290 being in circuit, the strip 304 will be heated by coil 302 and deflect into the position shown in Figure 10 to open valve 232 and supply gas to the igniting burner. The gas will be ignited by coil 290, in case the igniting burner is not already burning, and the large flame produced due to valve 232 being open will project through the lighter tube 240 and heat the bimetal strip 282. It will be noted that in this position strip 304 engages contact 320 for a purpose which will appear hereinafter.

As the strip 282 is heated it moves plate 276 toward the position shown in Figure 12, passing first through a position in which both switches 246 and 272 are open as shown in Figure 11. This, however, does not interrupt the circuit through coils 290 and 302 since there is a shunt circuit around switch 246 through lead 305, strip 304, contact 320 and lead 322.

Upon further heating of strip 282 the parts will move into the position shown in Figure 12 in which switch 272 is closed and a circuit through the motor which shunts out coils 290 and 302 will be completed from the transformer through lead 244, motor 224, lead 248 and contacts 324 and 326, lead 322, contact 320, strip 304, leads 305 and 254, strips 256 and 260, lead 264, contacts 266 and 268, lead 270, switch 272, and lead 274 back to the transformer. In this position motor 224 will be energized to open valve 222 and admit gas to the main burner, the gas being ignited by the flame from the igniting burner.

It will be noted that at this time coils 290 and 302 are shunted and they will start to cool, causing strip 304 to deflect into the position shown in Figure 12. As the valve 224 is opened, however, its stem 306 rocks lever 308 into contact with contact 310 and completes a motor holding circuit from the transformer through lead 244, motor 224, lead 248, contact 310, lever 308, lead 312, strips 256 and 260, lead 264, contacts 266 and 268, lead 270 switch 272 and lead 274 back to the transformer. This circuit will remain energized until either strip 256 deflects enough to move strip 260 away from contact 262 and interrupt it or until the furnace heats strip 284 sufficiently to rock disk 276 into a position to open switch 272.

With the circuit described in Figures 9 to 12 the fixed leak 237 may be omitted if desired since the lighter 290 and coil 302 which control valve 232 are simultaneously energized. The operation will then be identical with that described above except that the pilot will be extinguished each time the valve 232 is closed and relighted each time it is opened.

Figures 13 and 14 show an arrangement for manual control which is adapted to be used in connection with the circuits of both Figures 2 to 8 and 9 to 12 but which has been omitted from these figures for the sake of clarity and simplicity of illustration. In Figures 13 and 14 the parts which are shown in the other figures are indicated by the same reference numerals as in Figures 1 to 8. As shown a lever 114 is pivoted on a fixed pivot 116 and has a slot 118 adjacent its end engaging a pin rigidly secured to the valve stem 106. A latch is provided for holding the lever in the position in which valve 22 is open constituted by a rod 120 slidably mounted in the motor casing and having a collar 122 adjacent the outer end thereof and a collar 124 at the inner end thereof. A spring 126 acting between collar 122 and a fixed part 128 urges the latch out to the position shown in Figure 13.

The collar 122 also serves as a switch member to complete a circuit between a fixed contact 130 connected to lead 48 and a second fixed contact 132 connected by a lead 134 with the lead 74, these parts being indicated diagrammatically in Figures 2 and 9. When the latch is in the released position shown in Figure 13 the circuit through these parts is interrupted but when it is in its latched position shown in Figure 14 the circuit is completed.

The mercury switch mechanism is shown as inclosed in a casing 136 having a U-shaped member 138 secured thereto, the legs of the U being provided with holes to slidably receive a rod 140. The rod 140 is surrounded by a compression spring 142 acting between the lower leg of the U and a pin 144 in the rod to urge the rod into its upper position shown in Figure 13. The upper end of rod 140 is disposed directly below the end of lever 114 so that as the lever is depressed the rod will also be depressed.

A bent lever 146 is pivoted at 148 inside of casing 136 and has an upturned end 150 which, in the position of Figure 13, lies directly under the end of rod 140. This lever is so arranged as to be engaged by the disc 76 and rocked into different positions about its pivot upon movement of the disc.

A by-pass 152 is provided around the valve 32 and a valve 154 controls the flow of gas through the by-pass. The valve has an operating handle 156 which underlies the end of rod 140 to be engaged thereby as the rod is moved downwardly.

In Figure 13 the parts are shown in the position they will occupy when the pilot has just been lighted and while the strip 82 is still cold. In this position the valve 22 cannot be manually opened as any attempt to do so would force the lower end of rod 140 against the end 150 of lever 146 thereby preventing further downward movement of the rod and likewise of the outer end of lever 114. As strip 82 is heated by the pilot flame it moves disc 76 into the position shown in Figure 14 and this movement rocks lever 146 about its pivot to withdraw its end 150 from the path of rod 140. The end of lever 114 and rod 140 can now be depressed to open the main burner valve 22. As rod 140 moves downwardly it engages the handle 156 of the by-pass valve and rocks this valve into its closed position, there being sufficient opening of valve 22 before valve 154 is closed so that gas will be admitted to the main burner and ignited by the pilot before valve 154 is closed to extinguish the pilot. It will be noted that the above mechanism also prevents opening of valve 154 when the valve 22 is open and gas is discharging into the furnace, thereby preventing operation of the pilot when the furnace is filling with unburned gas.

When the lever 114 is rocked to open valve 22 the latch rod 120 is pressed in so that its shoulder 124 will engage the end of lever 114 and hold the valve open, the pressure of the lever on shoulder 124 holding the latch in. In this position of the latch as shown in Figure 14 the collar 122 bridges across contacts 130 and 132 completing a circuit from the transformer through lead 44, motor 24, lead 48, contact 130, collar 122, contact 132, lead 134 and lead 74 back to the transformer. It will be noted that this circuit is entirely independent of either of the thermostats or of the position of valve 26 and its associated switches so that as soon as electric current is available at the transformer the motor will be energized. The latch does not hold the valve 22 in its extreme open position so when the motor is energized it will raise valve stem 106 slightly and raise the end of lever 114 from the latch. This releases the latch and permits its spring 126 to return it to the position shown in Figure 13, at the same time interrupting the circuit between contacts 130 and 132. Thus as soon as current is available to operate the heating plant automatically the manual control is rendered inoperative and the system becomes subject to the automatic control circuits described above.

While two illustrative embodiments have been shown and described it will be apparent to those skilled in the art that many changes in structure or arrangement might be made or that the invention might be embodied in various other forms without departing from the spirit thereof. The illustrated embodiments will, therefore, not be taken as defining the scope of the invention but reference will be had for this purpose to the appended claims.

I claim:

1. A heating plant comprising a main burner, an igniting burner, means for constantly supplying a small quantity of fuel to the igniting burner for igniting the main burner, and control means to first ignite the igniting burner, increase the supply of fuel to the igniting burner whereby its flame will be projected adjacent the main burner, and then supply fuel to the main burner.

2. A heating plant comprising a furnace, a main burner in the furnace, an igniting burner outside of the furnace constantly burning with a small flame, and control means operable in response to the temperature both in the space to be heated and in the furnace to first increase the supply of fuel to the igniting burner and then supply fuel to the main burner.

3. A heating plant comprising a main burner, an igniting burner for the main burner, and temperature responsive means for automatically lighting the igniting burner, increasing the supply of fuel thereto and then supplying fuel to the main burner.

4. A heating plant comprising a main burner, an igniting burner, means responsive to the temperature of the space to be heated for lighting the igniting burner, means responsive to the temperature of the igniting burner and under the control of said first temperature responsive means for controlling the supply of fuel to the igniting burner, and means responsive to the temperature of the igniting burner and main burner and under the control of said first temperature responsive means for controlling the supply of fuel to the main burner.

5. A heating plant comprising a main burner, an igniting burner, valves for controlling the supply of fuel to said burners, means holding the main burner valve to prevent opening thereof only when the igniting burner valve is closed and means for closing the igniting burner valve when the main burner valve is opened.

6. A heating plant comprising a main burner, an igniting burner, valves for controlling the supply of fuel to said burners, means holding the main burner valve to prevent opening thereof only, and means responsive to the temperature of the igniting burner to render said holding means inoperative whereby the main burner valve can be opened and means for closing the igniting burner valve when the main burner valve is opened.

7. A heating plant comprising a main burner, an igniting burner for lighting the main burner, valves for controlling the supply of fuel to said burners, thermostatic means for controlling the operation of said valves, a by-pass around said igniting burner valve, a manually-operable valve for controlling said by-pass, manually operable means for controlling said main burner valve, means to prevent opening of the main burner valve when both said igniting burner valves are closed, means to render said preventing means inoperative when either of said igniting burner valves is open and means to close the by-pass valve when the main burner valve is opened.

8. A heating plant comprising a main burner, a pilot burner for lighting the main burner, valves for controlling the supply of fuel to said burners, means for manually operating the main burner valve, a by-pass around the igniting burner valve, a manually-operable valve controlling said by-pass, and means associated with the main burner valve to prevent opening of said by-pass valve when the main burner valve is open.

9. A system for controlling a main burner and a pilot burner having valves for controlling the supply of fuel to said burners, comprising electrical means to operate said valves, an electric control circuit for automatically controlling said means, a manual valve for also controlling the supply of fuel to said pilot burner, manual means for operating said main burner valve, means operatively associated with said main valve and said manual valve to prevent opening of said manual valve when the main burner valve is open, a latch to retain said main burner valve open when it is opened manually a circuit shunting said control circuit, and a switch operated by said latch for closing said shunt circuit when the main valve is latched open, the electrical actuating means for the main valve being operative when energized to release the latch whereby, when power is available for said circuits, said electrical means will be energized to release the latch and restore control to the control circuit.

10. In combination with a main burner, an igniting burner and a fuel feeding system including, valves for said burners, and an electric control system comprising in circuit an electric motor for controlling the main burner valve, electrically operated means for opening the igniting burner valve when said means is energized, an electric lighter for the igniting burner, a thermostat responsive to the temperature of the igniting burner for shunting out said electric lighter when the igniting burner is burning, and thermostatic means responsive to the main and igniting burners for shunting said means and establishing an operative circuit through said motor to open the main burner valve.

11. In a heating plant having a main burner, an igniting burner and an electric control circuit, means for controlling the igniting burner comprising a valve, means providing a fixed by-pass around the valve whereby the igniting burner will normally burn with a small flame, a bimetal strip arranged to open said valve when it is heated whereby the burner will burn with a large flame, an electrical heating unit connected in said control circuit and mounted in heat trasferring relation to said bimetal strip, an electrically controlled valve in said circuit for the main burner, and a switch in the circuit arranged to energize said last named valve and to shunt said heating unit when the switch is closed.

12. In combination with a main burner, a constantly burning pilot burner and a fuel feeding means for said burners including control valves, an electrical control system comprising in circuit an electric lighter for the igniting burner, a thermostat controlling said electric lighter, a second thermostat responsive to the temperature of the igniting burner for controlling the lighter, electrical means for operating the valve for controlling the supply of fuel to the igniting burner, said electrical means controlled by said first thermostat, and electrical means controlled by said first thermostat for controlling the supply of fuel to the main burner.

13. In combination with a main burner, a constantly burning pilot burner and a fuel feeding means for said burners including control valves, an electrical control system comprising in circuit an electric lighter for the igniting burner, a thermostat responsive to the temperature of the igniting burner to control said lighter, electrical means controlling the igniting burner fuel valve, thermostatic means for simultaneously energizing said electric lighter and said electrical means, electrical means for controlling said main burner fuel valve and means responsive to the temperature of the igniting burner for energizing said last named electrical means.

FRANCIS A. FURLONG.